United States Patent [19]

Rossmy et al.

[11] 3,723,491
[45] Mar. 27, 1973

[54] POLYSILOXANE-POLYALKYLENEGLYCOL BLOCK COPOLYMERS SUITABLE AS FOAM STABILIZERS IN THE MANUFACTURE OF POLYURETHANE FOAMS

[75] Inventors: Gerd Rossmy, Essen-Werden; Gotz Koerner, Mulheim (Ruhr), both of Germany

[73] Assignee: The Goldschmidt A.G., Essen, Germany

[22] Filed: Jan. 25, 1971

[21] Appl. No.: 109,699

Related U.S. Application Data

[63] Continuation-in-part of Ser. No. 687,459, Dec. 4, 1967, abandoned.

[52] U.S. Cl....260/448.2 B, 260/2.5 AM, 260/46.5 Y, 260/448.8 R
[51] Int. Cl..............................C07f 7/08, C07f 7/18
[58] Field of Search.................260/448.2 B, 448.8 R

[56] References Cited

UNITED STATES PATENTS

| | | | |
|---|---|---|---|
| 3,168,543 | 2/1965 | Black et al. | 260/448.2 B |
| 3,182,076 | 5/1965 | Holdstock | 260/448.2 B |
| 3,271,331 | 9/1966 | Ender | 260/448.2 B X |
| 3,272,762 | 9/1966 | Ibbotson et al. | 260/448.2 B X |
| 3,280,160 | 10/1966 | Bailey | 260/448.8 R |
| 3,299,113 | 1/1967 | Haluska | 260/448.8 R |
| 3,341,338 | 9/1967 | Pater | 260/448.2 B X |
| 3,342,766 | 9/1967 | Huntington | 260/448.2 B X |
| 3,402,192 | 9/1968 | Haluska | 260/448.2 B |
| 3,420,782 | 1/1969 | Dahm et al. | 260/448.2 B X |
| 3,457,173 | 7/1969 | Pater | 260/448.2 B X |

*Primary Examiner*—Daniel E. Wyman
*Assistant Examiner*—Paul F. Shaver
*Attorney*—McGlew & Toren

[57] ABSTRACT

Novel polysiloxane-polyalkyleneglycol block copolymers suitable as foam stabilizers in the preparation of flexible polyurethane foams. The novel block copolymers are characterized by the formula A B y, wherein $y$ is $= 1.75$ to $5$;

A indicates the polysiloxane moiety of the block copolymer and being characterized by a mole weight of between about $250 \cdot y$ to $1000 \cdot y$, 1.9 to 2.02 alkyl and alkoxy groups on the average being associated with each silicon atom, the alkyl and alkoxy groups containing one to four carbon atoms, at least 90 mole percent of the alkyl groups being methyl and the alkoxy groups being present in an amount of at least 10 mole percent calculated on the alkyl groups;

B indicates the polyalkyleneglycol monoalkylether moiety or polyalkylene glycol monoarylether moiety which is characterized by a mole weight of between about 2400 to 5000, wherein the alkyl group has one to six carbon atoms and the polyalkyleneglycol residue is composed on the one hand of alkyleneoxy groups of the formula

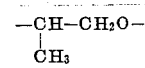

and/or $-(CH_2)_4O-$ and, on the other hand, of the group $-(CH_2)_2O-$ in a weight ratio of about 50:50 to 70:30; and wherein A and B are linked to each other by divalent groups being oxygen, alkylene of one to four carbon atoms, $-(CH_2)_2COO-$ or $-(CH_2)_3COO-$.

The application also discloses a process of preparing polyurethane foams, wherein the novel block copolymers are used as foam stabilizer.

15 Claims, No Drawings

POLYSILOXANE-POLYALKYLENEGLYCOL BLOCK COPOLYMERS SUITABLE AS FOAM STABILIZERS IN THE MANUFACTURE OF POLYURETHANE FOAMS

This application is a continuation-in-part of Ser. No. 687,459, filed 12/4/67, now abandoned.

SUMMARY OF THE INVENTION

This invention relates to novel polysiloxane-polyalkyleneglycol block copolymers and to a process of producing flexible polyetherurethane foams in which the novel polysiloxane-polyalkyleneglycol block copolymers are used as foam stabilizers.

It has previously been suggested to produce polyurethane foams by a one stage reaction of polyalkyleneglycol with polyisocyanates. The reaction system for this reaction comprises water and/or an organic propellant as, for example, a halogenated hydrocarbon, particularly fluoro-hydrocarbon. It is also known in the art to perform this reaction in the presence of catalysts as, for example, organo-tin compounds having a carbon-tin bond or with tinoctoate, triethylenediamine, N-methylmorpholine or mixtures thereof.

In addition to the additives referred to and, particularly, if the foaming is carried out in a single stage, polysiloxane-polyalkyleneglycol block copolymers are customarily added to the system as foam stabilizers.

A satisfactory foam stabilizer for the indicated purpose should fulfill a number of requirements which, however, are only partially met by the prior art products as they are available on the market. It will thus be appreciated that it is, of course, of utmost importance that the block copolymer exhibits a high degree of stabilizing capacity which renders it possible to operate with low amounts of foam stabilizers. The polysiloxane moiety in the block copolymer should, moreover, be as small as possible, since the price of the stabilizer is very much dependent on the amount of polysiloxane in the polymer. The lower the amount of polysiloxane in the polymer, the lower the price.

Another desirable characteristic of an optimum foam stabilizer used for the indicated purpose is that it should be relatively insensitive to changes in the foaming composition. For example, it is desirable that, independent of the amount of tin or the like catalyst which may be present in the foaming system, the stabilizer should permit the formation of a foam homogeneous and uniform porosity. This, of course, is a most important criterion because it results in more uniform reaction products, the quality of which is relatively independent of the amount of catalysts in the system. Further, within certain fluctuation ranges of the various ingredients, foams of substantially identical and uniform characteristics, particularly in respect to porosity are thus nevertheless obtained, which is a most desirable criterion.

Another task to be fulfilled by the foam stabilizer is that it should cause the propellent gas, which is formed during the reaction or which has been supplied to the foaming charge, to be effective in its propellent action to a high degree so that foams of low density are formed. The formed foam should be as stable as possible so that upon shaping or forming no or only insignificant lasting deformation takes place.

As is well recognized by those skilled in this specialized art, the combination of the desirable features and effects enumerated above is not achieved in present day foam stabilizers as available in commerce.

Accordingly, it is a primary object of this invention to provide a foam stabilizer for the indicated purpose which has all the desirable features and effects referred to and which results, when used as a foam stabilizer in the foaming of polyurethane foams, in a foam of superior quality and characteristics.

Another object of the invention is to provide a foam stabilizer of the indicated kind which is easy to manufacture at relatively low cost and from relatively readily available raw materials.

Briefly, and in accordance with this invention, it has surprisingly been ascertained that certain selected polysiloxane-polyalkyleneglycol block copolymers possess all the desired features and characteristics to make them superior foam stabilizers for the indicated purpose.

The invention polysiloxane-polyalkyleneglycol block copolymers correspond to the general formula A B y, wherein $y = 1.75$ to $5$;

A indicates the polysiloxane moiety whose mole weight is between about $250 \cdot y$ to $1000 \cdot y$, 1.9 to 2.02 alkyl and alkoxy groups being present in the average per silicon atom, the alkyl and alkoxy groups containing one to four carbon atoms, at least 90 mole percent of the alkyl groups being methyl groups while the alkoxy groups are present in an amount of at the most 10 mole percent calculated on the alkyl groups;

B indicates the polyalkyleneglycolmonoalkyl— or arylether moiety with a mole weight of between about 2,400 to 5,000, wherein the alkyl has one to six carbon atoms and the polyalkyleneglycol consists of alkyleneoxy groups of the formula

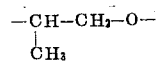

and/or $-(CH_2)_4O-$ on the one hand and $-(CH_2)_2 O-$ on the other, the weight ratio between the alkyleneoxy of the formulas B and C, and D, respectively being between 50:50 to 70:30 and wherein A and B are linked by divalent groups which preferably consist of oxygen, alkylene of one to four carbon atoms, the group $-(CH_2)_2COO-$ or $-(CH_2)_3 COO-$.

Although y has been indicated to have a value of between 1.75 to 5, it has been found that the preferred range is 2 - 3.5. In this connection, it should be pointed out that the value for y may be relatively low if the polyalkyleneglycolmonoalkyl— or arylether group has a high molecular weight within the indicated range.

As stated above, at least 90 mole percent of the alkyl linked to silicon atoms are methyl groups. The remaining alkyl groups are preferably ethyl, propyl and isobutyl. Preferred alkoxy groups are those which are derived from a secondary alcohol. Examples for such alcohols are isopropyl alcohol and secondary butyl alcohol. The alkyl and/or alkoxy groups may be chlorinated without negatively affecting the result.

The polysiloxane moiety is essentially composed of structural units of the formula $[R_2 SiO]$, wherein R symbolizes the alkyl groups. In an average polymer molecule, there are preferably contained 0 – 5 structural units of the formula [R SiO$_{3/2}$]or 0 – 3 structural units of the formula [SiO$_{4/2}$].

The preparation of polysiloxane-polyalkyleneglycol block copolymers always results in the formation of mixtures of individual species of different molecular weight and distribution degree. In accordance with the invention and for this reason, block copolymers are thus used whose polysiloxane moiety is equilibrated or exhibits a relatively narrow molecular weight distribution.

From the indication that the molecular weight of the polysiloxane moiety is between about 250 · y to 1000 · y, it follows that the lower limit value for the molecular weight of the polysiloxane is about 437, the upper limit value being about 5000. The preferred molecular weight for the polysiloxane should be between about 600 to 3,250.

The alkyl group in the polyalkyleneglycol monoalkylether residue is preferably n-butyl. In respect to the arylether, the respective group is preferably phenyl which may be substituted. The polyalkyleneglycol residue or moiety is composed on the one hand from alkyleneoxy groups of the formula

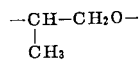

and/or —(CH$_2$)$_4$O— and on the other hand from alkyleneoxy groups of the formula —(CH$_2$)$_2$O—. Within the first-mentioned group, the group of the formula

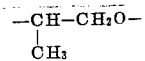

is preferred. If a portion of this group is replaced by alkyleneoxy of the formula —(CH$_2$)$_4$O—, it must then be observed that for the purpose of obtaining the same degree of hydrophobic property, the ethyleneoxy content must be increased within the indicated limit values. Characterizing for the ratio of the alkyleneoxy of the formula

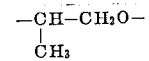

and/or —(CH$_2$)$_4$O— to the alkyleneoxy of the formula —(CH$_2$)$_2$O— is a weight ratio of from 50:50 to 70:30. A weight ratio within this range of from 55:45 to 65:35 is particularly advantageous. The different alkyleneoxy groups within the polyalkyleneglycol moiety should be present in statistical arrangement or in the form of small blocks of at the most 5 units each. The preferred molecular weight range of the polyalkyleneglycol monoalkyl- or aryl-ether residue is 2,600 to 3,000.

The polysiloxane moiety A and the polyalkyleneglycol moiety B are linked to each other in the block copolymer by divalent groups. The linkage may be effected by oxygen or an alkylene group. Particularly suitable alkylene groups are those containing one to four carbon atoms such as —CH$_2$—(CH$_2$)$_2$—(CH$_2$)$_3$— CH$_2$—CH—CH$_2$—. Further, the groups —(CH$_2$)$_2$ and —(CH$_2$)$_3$COO— are particularly suitable for causing the linkage between the moieties A and B.

It is possible to prepare the inventive poly-siloxane-polyalkylene glycol block copolymers in a manner known per se. Block copolymers, wherein the blocks A and B are linked by oxygen may, for example, be prepared corresponding to the teaching of German Pat. Nos. 1,012,602 and 1,040,251 or U.S. Pat. No. 3,115,512. By contrast, block copolymers wherein the blocks A and B are connected by means of an alkylene group can be prepared, for example, according to German Pat. No. 1,115,927. The preparation of block copolymers, wherein the blocks A and B are connected by the group RCOO can be learned from U.S. Pat. No. 2,991,300.

The invention will now be described by several Examples, it being understood, however, that these Examples are given by way of illustration and not by way of limitation and that many changes may be effected without affecting in any way the scope and spirit of the invention as recited in the appended claims.

EXAMPLE 1

A mixture consisting of 299 g of methyltrichlorosilane and 3302.4 g of dimethyldichlorosilane was charged into a three neck flask fitted with a drop funnel, stirrer and reflux condenser. 479 g of water were added to the flask in dropwise manner during 1 hour. The partial hydrolysis that took place was completed after 1 hour of stirring at room temperature and after 1 hour of heating to 100° C and stirring at this temperature for two and a quarter hours. After cooling to 50° C, 46 g of 98 percent sulfuric acid were added to the reaction mixture and equilibration was effected for 18 hours at this temperature and subsequently for two hours at 100° C. The siloxane obtained in this manner had an acid value of about $1.8 \times 10^{-3}$ val acid per g. To convert the siloxane obtained in this manner to a stabilizer, 200 g of a polyethermonool of a molecular weight of 2700 with a propylene-ethyleneoxide ratio of 58:42 and 1.37 g of isopropanol in 520 ml of toluene were added at 50° C to 50.1 g of the siloxane and the mixture was stirred for 30 minutes. NH$_3$ was subsequently introduced for 30 minutes and after a reaction time of 1 hour, the toluene was removed by distillation at 9 mm Hg. After the addition of 30 ml of ethanol and 1 ml of ethanolamine, stirring was effected at 70° C for 1 hour, the ethanol was distilled off at 9 mm Hg, 1 ml of ethanolamine was added and the reaction mixture was subjected to filtration.

The stabilizing capability of the stabilizer thus produced was tested by means of the following critical polyurethane foam formulation and was compared with the stabilizing capability of a customary stabilizer as it is available on the market:

100 g of polyalkyleneglycol ether (OH number 55), 0.5 g of Sn-octoate, 0.2 g of N-ethylmorpholine, 35 g of CFCl$_3$, 6 g of water and between about 0.4 and 2.2 g of stabilizer were foamed with toluylenediisocyanate (80/20) index 109.

The rising height or level of the foam was chosen as the measure for the stabilizing capability. The critical stabilizing concentration indicates the additional amount of stabilizer which is necessary in order to obtain a satisfactory foam. It corresponds to the height at which significant retraction of the height of the sample is observed.

| Amount of stabilizer (in gram) added per | Height obtained with the inventive | Height obtained with prior art |
| --- | --- | --- |

| 100 g of polyether | stabilizer (% of the highest level obtained within the several tests performed) | stabilizer known as L 520 of Union Carbide Corporation |
|---|---|---|
| 2.2 | 100 | 93.5 |
| 2.0 | 100 | 92.5 |
| 1.8 | 100 | 91.0 |
| 1.6 | 100 | 87.4 |
| 1.4 | 100 | 83.0 |
| 1.2 | 100 | 72.4 |
| 1.0 | 98.5 | 59.2 |
| 0.8 | 98.0 | 50.0 |
| 0.6 | 96.0 | |
| 0.4 | 92.0 | |

The critical stabilizer concentration with the inventive stabilizer is 0.4 parts. By contrast, with the prior art stabilizer the corresponding concentration is between 1.8 and 2.0 parts, calculated on 100 parts of polyalkyleneglycol.

EXAMPLE 2

In a manner analogous to that described in Example 1, foaming tests were carried out with the following inventive stabilizer:

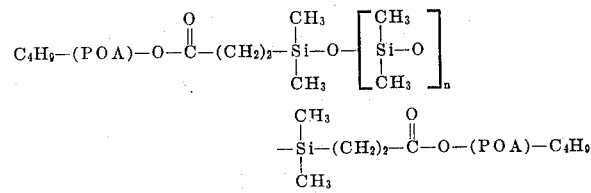

In this formula, the siloxane chain has a molecular weight distribution corresponding to the statistical equilibrium and is on the average $= 13$ ($n = 13$). The symbol POA indicates a polyalkyleneoxide group which is built up from propyleneoxide and ethyleneoxide residues. The weight ratio of propyleneoxide to ethyleneoxide is 59 to 41. The individual propyleneoxide and ethyleneoxide groups are arranged in statistical sequence. The molecular weight of the polyalkylene oxide block amounts to 3100. Foaming tests were carried out with this product which yielded results analogous to those of Example 1.

EXAMPLE 3

A foam stabilizer of the formula:

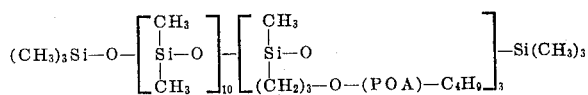

was prepared in known manner from equilibrated siloxane of the average formula

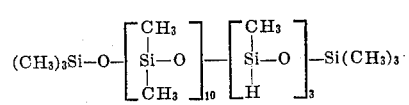

wherein 10 and 3 are average values, the siloxane having been reacted with polyalkyleneglycolmonobutyl-monoallylether POA again indicates a polyalkylene group having a molecular weight of 2700, the weight ratio of propylene oxide to ethylene oxide units being 60 to 40. The tests performed with this foam stabilizer showed results corresponding to those of Example 1.

EXAMPLE 4

The foaming tests were carried out in the presence of the following stabilizer:

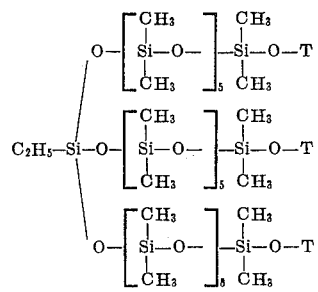

In this formula, T means either $C_2H_5$ or a (POA) $C_4H_5$ group in which 10 mole percent of the groups T are $C_2H_5$ groups and 90 mole percent are (POA) $C_4H_9$ groups. POA again indicates a polyalkylene oxide block with the weight ratio of propyleneoxide to ethyleneoxide of 56 : 44, the block having a mole weight of 3300. In the polyoxyalkylene block the distribution of propyleneoxide and ethyleneoxide was such that, on the average, 3 propyleneoxide units were followed by 3 ethyleneoxide units, the last group being a propyleneoxide group which is then linked with the Si atom.

The compounds were prepared in a manner known per se. First, triethoxypolysiloxane was produced by alkaline polymerization and was then re-esterified with polyalkyleneglycolmonobutylether. Trifluoroacetic acid was used as a catalyst.

Also this foam stabilizer yielded results equivalent to those obtained with the stabilizers of Examples 1 and 3.

While specific embodiments of the invention have been shown and described in detail to illustrate the application of the inventive principles, it will be understood that the invention may be embodied otherwise without departing from such principles.

What is claimed is:

1. A polysiloxane-polyalkyleneglycol block copolymer of the general formula

A B y, wherein $y = 1.75$ to 5;

A indicates the polysiloxane moiety of the block copolymer and being characterized by a mole weight of between about $250 \cdot y$ to $1000 \cdot y$, 1.9 to 2.02 alkyl groups on the average being associated with each silicon atom, the alkyl groups containing one to four carbon atoms, at least 90 mole percent of the alkyl groups being methyl and the remaining valences of the silicon atoms being satisfied by alkoxy or siloxy units of the formula [R₂SiO], [R SiO₃/₂] and [SiO₄/₂], wherein R is alkyl, B indicates the polyalkyleneglycol monoalkylether moiety or polyalkyleneglycol monoarylether moiety which is characterized by a mole weight of between about 2,400 to 5,000, wherein the alkyl group has one to six carbon atoms and the polyalkyleneglycol residue is composed on the one hand of alkyleneoxy groups of the formula

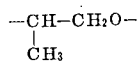

and/or —(CH₂)₄O— and on the other hand of the group —(CH₂)₂O— in a weight ratio of about 50:50 to 70:30; and wherein A and B are linked to each other by divalent groups being oxygen, alkylene of one to four carbon atoms, —(CH₂)₂COO— or —(CH₂)₃COO—.

2. A block copolymer as claimed in claim 1, wherein $y = 2$ to $3.5$.

3. A block copolymer as claimed in claim 1, wherein the remaining 10 mole percent of said alkyl groups of A are ethyl, propyl or isobutyl.

4. A block copolymer as claimed in claim 1, wherein the polysiloxane moiety A is essentially composed of structural units of the formula [R₂SiO] wherein R symbolizes alkyl.

5. A block copolymer as claimed in claim 1, wherein the molecular weight of the polysiloxane moiety A is between about 600 to 3,250.

6. A block copolymer as claimed in claim 1, wherein the alkyl group of the polyalkyleneglycol monoalkylether moiety is n-butyl.

7. A block copolymer as claimed in claim 1, wherein the aryl group of the polyalkyleneglycol monoarylether moiety is phenyl or substituted phenyl.

8. A block copolymer as claimed in claim 1, wherein the alkyleneoxy groups of B are

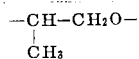

and —(CH₂)₂O—.

9. A block copolymer as claimed in claim 1, which corresponds to the formula

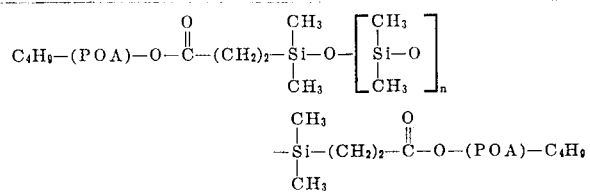

wherein $n$ is on the average 13 and POA symolizes a polyalkyleneoxide group composed of propylene oxide and ethylene oxide in a weight ratio of about between 59:41, the mole weight of POA being about 3,100.

10. A block copolymer as claimed in claim 1, which corresponds to the formula

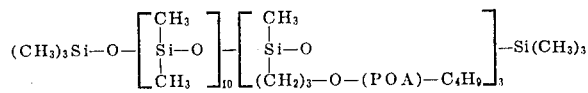

wherein POA symbolizes polyalkylene oxide of a mole weight of about 2,700 and consisting of propylene oxide and ethylene oxide in a weight ratio of about between 60:40.

11. A block copolymer as claimed in claim 1, which corresponds to the formula

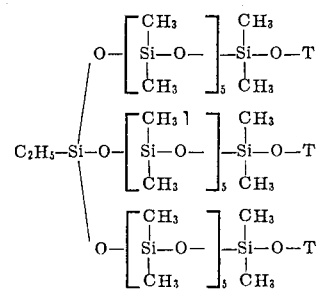

wherein T symbolizes C₂H₅ or (POA) C₄H₉, in which 10 mole percent of T is C₂H₅ and 90 mole percent (POA) C₄H₉, POA symbolizing polyalkylene oxide composed of propylene oxide and ethylene oxide in a weight ratio of about between 56:44, the mole weight of POA being about 3,300.

12. A block copolymer as claimed in claim 1, wherein alkoxy groups are contained in said polysiloxane moiety, the amount of said alkoxy groups being at the most 10 mole percent calculated on the alkyl groups.

13. A block copolymer as claimed in claim 12, wherein said alkoxy groups of A are derived from a secondary alcohol.

14. A block copolymer as claimed in claim 13, wherein said secondary alcohol is isopropyl alcohol or secondary butyl alcohol.

15. A block copolymer as claimed in claim 13, wherein said alkoxy groups are chlorinated.

* * * * *